(12) United States Patent
Nishimura

(10) Patent No.: US 7,469,976 B2
(45) Date of Patent: Dec. 30, 2008

(54) RUBBER CRAWLER BELT HAVING METAL CORES AND ARCUATE LUGS

(75) Inventor: Naoki Nishimura, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/514,036

(22) PCT Filed: May 13, 2003

(86) PCT No.: PCT/JP03/05950

§ 371 (c)(1),
(2), (4) Date: Dec. 15, 2004

(87) PCT Pub. No.: WO03/095292

PCT Pub. Date: Nov. 20, 2003

(65) Prior Publication Data

US 2005/0173983 A1   Aug. 11, 2005

(30) Foreign Application Priority Data

May 14, 2002   (JP)   ............................. 2002-138244

(51) Int. Cl.
*B62D 55/24*   (2006.01)
(52) U.S. Cl. .................. 305/169; 305/177; 305/179
(58) Field of Classification Search ............. 305/157, 305/160, 165, 167, 168, 158, 169, 175, 177, 305/195, 171, 172, 173, 174, 178, 176, 179, 305/181; D15/28
See application file for complete search history.

(56) References Cited

U.S. PATENT DOCUMENTS

| | | | | |
|---|---|---|---|---|
| 3,451,729 A | * | 6/1969 | Roy | 305/168 |
| 3,664,715 A | * | 5/1972 | Huber | 305/179 |
| 3,704,918 A | * | 12/1972 | Perreault | 305/168 |
| 3,754,798 A | * | 8/1973 | Chaumont | 305/166 |
| 5,174,638 A | * | 12/1992 | Tokue et al. | 305/166 |
| 5,415,470 A | * | 5/1995 | Courtemanche | 305/168 |
| 5,522,655 A | * | 6/1996 | Katoh | 305/174 |
| 5,709,440 A | * | 1/1998 | Lecours | 305/178 |
| 5,713,645 A | * | 2/1998 | Thompson et al. | 305/168 |
| 5,984,437 A | * | 11/1999 | Katoh | 305/159 |
| 6,176,557 B1 | * | 1/2001 | Ono | 305/177 |
| 6,422,666 B2 | * | 7/2002 | Choi | 305/178 |

(Continued)

FOREIGN PATENT DOCUMENTS

JP   1-223085   *   9/1989

(Continued)

*Primary Examiner*—Russell D Stormer
(74) *Attorney, Agent, or Firm*—Sughrue Mion, PLLC

(57) ABSTRACT

The object of the present invention is to provide a rubber crawler in which a shape of the central lug viewed from a lateral side of the rubber crawler is approximately in the form an arc. Therefore, at a time of driving of the rubber crawler repeating back and forth movement, even if a large resisting force from the road surface due to an impediment, such as gravel, is subjected to the central lug particularly disposed close to a sprocket engagement section, the resisting force can be parried for dispersion to a suitable degree by such arrangement, so that there is no possibility of early peel occurring in the central lug or such peeling is prevented from extending to tread members connected thereto; thus, the life is prolonged.

10 Claims, 6 Drawing Sheets

U.S. PATENT DOCUMENTS

| | | | | |
|---|---|---|---|---|
| 6,588,862 B1 | * | 7/2003 | Pringiers | 305/167 |
| 6,609,771 B2 | * | 8/2003 | Morin et al. | 305/178 |
| D484,515 S | * | 12/2003 | Nishimura | D15/28 |
| D496,051 S | * | 9/2004 | Yoshida | D15/28 |
| D549,741 S | * | 8/2007 | Tateishi et al. | D15/28 |
| D562,353 S | * | 2/2008 | Sugihara | D15/28 |

FOREIGN PATENT DOCUMENTS

| | | | |
|---|---|---|---|
| JP | 1-223086 | * | 9/1989 |
| JP | 1-229782 | * | 9/1989 |
| JP | 3-193574 A | | 8/1991 |
| JP | 5-139344 | * | 6/1993 |
| JP | 7-117739 A | | 5/1995 |

* cited by examiner (A)

RUBBER CRAWLER BELT HAVING METAL CORES AND ARCUATE LUGS

BACKGROUND OF INVENTION

1. Field of the Invention

The present invention relates to a core embedded rubber crawler, particularly a rubber crawler in which a plurality of longitudinally spaced cores are embedded in a width direction of the rubber crawler, sprocket engagement holes are perforated between the cores, and two rows of longitudinally spaced tread members are disposed on the left and right side of the outer peripheral grounding surface of the rubber crawler.

2. Description of the Related Art

In FIG. 4, a core embedded rubber crawler, which is a typical example of a conventional rubber crawler is widely used. As shown in FIG. 4(A), the rubber crawler 21 has a main body 22 in the form of an endless belt. To enhance a transverse rigidity of the main body 22 of the rubber crawler 21 and a driving force resistance on driving the rubber crawler 21, a plurality of longitudinally spaced cores 23 are embedded in a width direction of the rubber crawler 21. As shown in FIG. 4(C) of the C-C cross-section in FIG. 4(A), in order to enhance the longitudinal rigidity of the main body 22 of the rubber crawler 21 and the driving force resistance, if necessary, a reinforcing cord 26 embedded in the main body 22 of the rubber crawler 21 approximately at the intermediate part thereof with respect to the thickness direction is arranged on an outer peripheral grounding side of the core 23. The reinforcing cord 26 is obtained by placing a number of reinforcing filaments 26A, 26B side by side and applying a treatment such as rubberizing thereto. Such rubber crawler is referred to as a core and cord embedded rubber crawler.

In this conventional example, as shown in the bottom view of FIG. 4(B), sprocket engagement holes 25 are perforated between the longitudinally spaced cores 23 embedded along the centerline of the rubber crawler 21. The rubber crawler 21 has two rows of longitudinally spaced tread members 28A, 28B which are alternatively disposed on the left and right sides of the outer peripheral grounding surface of the rubber crawler. Also, for protecting the core 23 and ensuring a tractional force, the rubber crawler 21 has a central lug 29 which constitutes a part of the main body and is arranged in the connection section between the tread members 28A and 28B to connect the tread members to each other in a position embedding the core 23. In this type of the core embedded rubber crawler as shown in FIG. 4(C), both of left and right sides of the core 23 of the outer peripheral grounding side on which the reinforcing cord 26 is embedded are thinly constructed, and the central section of the core 23 engaged by a sprocket is thickly constructed for reinforcing. As a result, it is necessary to reduce relatively the thickness of the section of the central lug 29 which connects between the tread members 28A, 28B.

Therefore, as shown in FIG. 4(A), when the rubber crawler is driven in the direction shown by the white arrow, the rubber crawler 21 moves on a road surface in the right direction of the figure while abutting the road surface and thus the rear portion of the tread member 28 or the central lug 29 (shown by the black arrow) allows a tractional force to act on the road surface. Based on FIG. 5 of a macrograph of this section (corresponding to "B" of FIG. 4(B)), the force acting on to each components of the rubber crawler is analyzed by a relation between the tractional force of the rubber crawler (sprocket driving force) and the resistance force of the surface. As mentioned above, to ensure a volume of a rubber, the central lug 29 is structured to have a face perpendicular to the running direction of the rubber crawler, so that the core 23 can be protected and the tractional force can be sufficiently obtained. Also, in order to ensure a directional stability of the rubber crawler, a driving surface of the rubber crawler, which is the rear side with respect to the running direction on forth movement, is configured to have a two step inclination, and to make the rear inclined surface of the central lug 29 and the tread member 28B to have the approximately same height as each other.

In the central lug 29, ① a shearing stress by the driving force acts on an interface between the core 23 and the central lug 29, ② compressive forces generated perpendicularly from the road surface act on the outer peripheral grounding side of the central lug 29, and ③ a rotational force from the road surface showing tendency stripping the lug is given to the rear inclined surface of the central lug 29. These forces largely affect the vicinity of the central lug 29 which faces to the sprocket engagement section to which the sprocket driving force directly acts on. Thus, a peeling of the rubber easily occurs in the vicinity of the central lug 29. A cutting damage by the forces ② and ③ owing to in the vicinity of the central lug 29 the resistance force of the surface and the impediment is given, resulting in reducing the rigidity of the central lug 29. In addition to these, the force ① is applied to the tread members 28A, 28B connecting to the central lug 29, which are peeled off. As a result, as shown in FIG. 6, the peeling which occurred in the vicinity of the central lug 29 leads to the peeling on the tread members 28A and 28B.

FIG. 7 includes graphical representations for driving times of the rubber crawler having a conventional central lug which drove on a rough road such as gravel for a long time, In the figure, the driving times of the rubber crawler are 20 h, 70 h and 100 h from top (A) to bottom (C). After 20 h, it is observed that the central lug 29 including both sides of the tread members slightly abrades. After 70 h, it is found that an exposure of the core 23 caused by the peeling of the central lug 29 partially occurs. After 100 h, the central lug 29 mostly peels and the core 23 emerges, and furthermore the reinforcing cord 26, for example made of steel, partially emerges, Therefore, in addition to a corrosion-cut of the reinforcing cord 26, a protection ability of the core 23 by the central lug 29 completely disappears and a life of the rubber crawler remarkably reduces.

SUMMARY OF THE INVENTION

It is therefore the object of the present invention to provide a rubber crawler which solves the above-mentioned problems with respect to the conventional rubber crawler, and which prevents effectively an occurrence of the damage in the central lug causing a peeling of the tread members and sakes it possible to remarkably improve a durability performance.

The present invention is provided by a rubber crawler comprising a plurality of longitudinally spaced cores embedded in a width direction of the rubber crawler, sprocket engagement holes perforated between the cores, two rows of longitudinally spaced tread members disposed on the left and right sides of the outer peripheral grounding surface of the rubber crawler respectively, and a central lug arranged between the tread members for binding the tread members in an embedding position of the core, wherein a shape of the central lug viewed from a lateral side of the rubber crawler is approximately in the form of an arc.

In the shape of the central lug viewed from the lateral side of the rubber crawler, it is preferable that the arc is configured such that a center of a circle corresponding to the arc is located in a surface on a ground contacting side of the core. Also, it is preferable that the central lug is arranged inside the rear side of the tread member with respect to the running direction of the rubber crawler.

BRIEF DESCRIPTION OF THE DRAWINGS

FIG. 1 is a view showing an embodiment of the rubber crawler according to the invention, in which FIG. 1(A) shows an A-A cross-section in an "A" portion of FIG. 1(B) and FIG. 1(B) shows a bottom view of the rubber crawler.

DETAILED DESCRIPTION OF THE INVENTION

Figure 1:
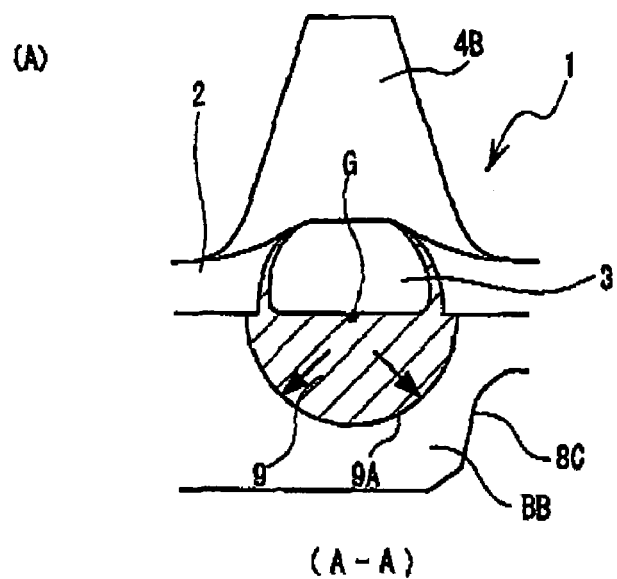
Figure 1:
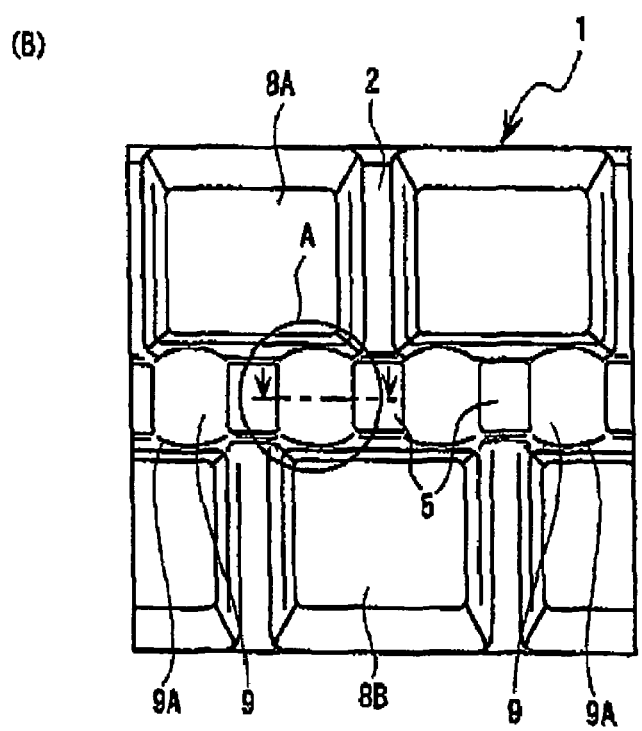
Figure 2:
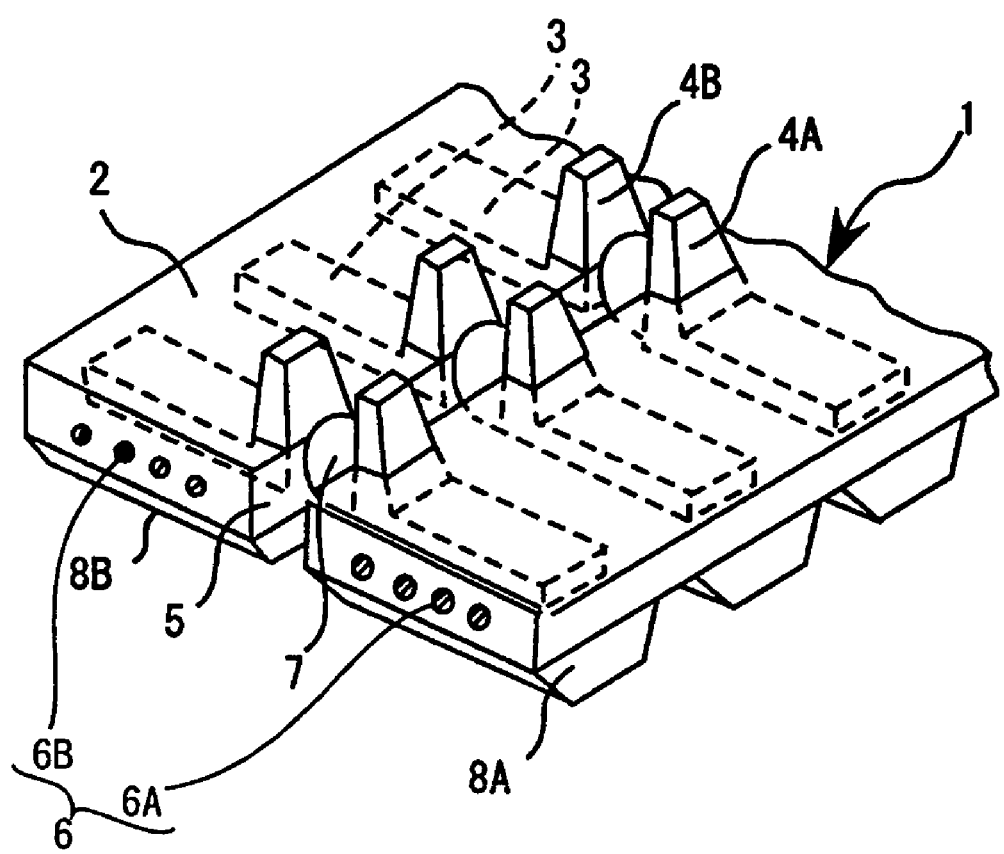
FIG. 2 is an oblique perspective view of the rubber crawler according to the invention.

The embodiments of the invention are explained in details based on the attached drawings below:

FIGS. 1 and 2 show an embodiment of a rubber crawler according to the present invention. FIG. 1(A) shows a substantial cross-section of the rubber crawler 1, which illustrates an A-A cross-section in an "A" portion of FIG. 1(B), and FIG. 1(B) shows a bottom view of the rubber crawler 1, and FIG. 2 shows an oblique perspective view of the rubber crawler 1.

In the present invention, a rubber crawler 1 has a basic structure consisting of a plurality of longitudinally spaced metal cores 3 embedded in a width direction of the rubber crawler 1, sprocket engagement holes 5 perforated between the cores 3, two rows of longitudinally spaced tread members 8A, 8B disposed on the left and right side of the outer peripheral grounding surface of the main body 2 of the rubber crawler 1 respectively, and a central lug 9 arranged between the tread members 8A, 8B for binding the tread members in an embedding position of the core 3, and furthermore is characteristic in that a shape of the central lug 9 viewed from a lateral side of the rubber crawler 1 is approximately in the form of an arc.

As shown in the oblique perspective view of the FIG. 2, the rubber crawler 1 has a main body 2 in the form of an endless belt comprising a rubber, and a plurality of the longitudinally spaced plate cores 3 are embedded such that the long side of the core is arranged in a width direction of the rubber crawler. A pair of left and right guide members 4A, 4B upwardly (in the direction of inner peripheral side) project from both sides of a sprocket engagement section 7 which is located approximately at the center of these cores 3, and therefore the guide members come out the main body 2. Outsides of guide members 4A, 4B on the core 3 are configured to have the form of plate to form a wing. On the ground contacting side of each of the wings, a reinforcing cord 6 (main cord) is embedded together with a number of reinforcing filaments 6A, 6B placed side by side which are subjected to a treatment such as rubberizing. Sprocket engagement holes 5 are perforated between the cores 3 along the centerline with respect to the width of the rubber crawler 1.

As shown in FIG. 1(B) which is the bottom view of the rubber crawler 1, two rows of longitudinally spaced tread members 8A, 8B project from the left and right side of the outer peripheral grounding surface of the main body 2. In FIG. 1(B), these tread members 8A, 8B are configured to have a rectangular shape and are disposed over adjacent cores 3, and are alternatively arranged in a zigzag pattern. However, these tread members 8A, 8B can also be configured to have a usual parallel form or a usual oblique form which is disposed so as to correspond to a position of the core 3. A central lug 9 is disposed in the embedding position of the core 3 for binding the tread members 8A, 8B. Therefore, the central lug 9 is arranged to the backside of the sprocket engagement section 7.

As shown in the substantial cross-section of FIG. 1(A), the present invention has a distinctive feature in that a shape of the central lug 9 (a region of hatching) viewed from a lateral side of the rubber crawler 1 is approximately in the form of an arc 9A. It is preferable that the arc 9A is configured such that a center G of a circle corresponding to the arc 9A is located in a surface on a ground contacting side of the core 3. The shape of the central lug 9 viewed from the lateral side is preferably the approximately in the form of the arc, but a shape such as an ellipse can also be used insofar as that the shape of the central lug 9 viewed from the lateral side is configured successively without rapid changes in a shape such as formation of an apex. It is preferable to arrange the arc 9A perpendicularly to a running direction of the rubber crawler inside a surface 8C (rear surface) of the tread member 8B. This leads to avoid an interference with an impediment on the road surface when driving the rubber crawler, and to reduce an opportunity of the damage of the central lug 9 resulting in peeling of the tread member 8B.

Figure 3:
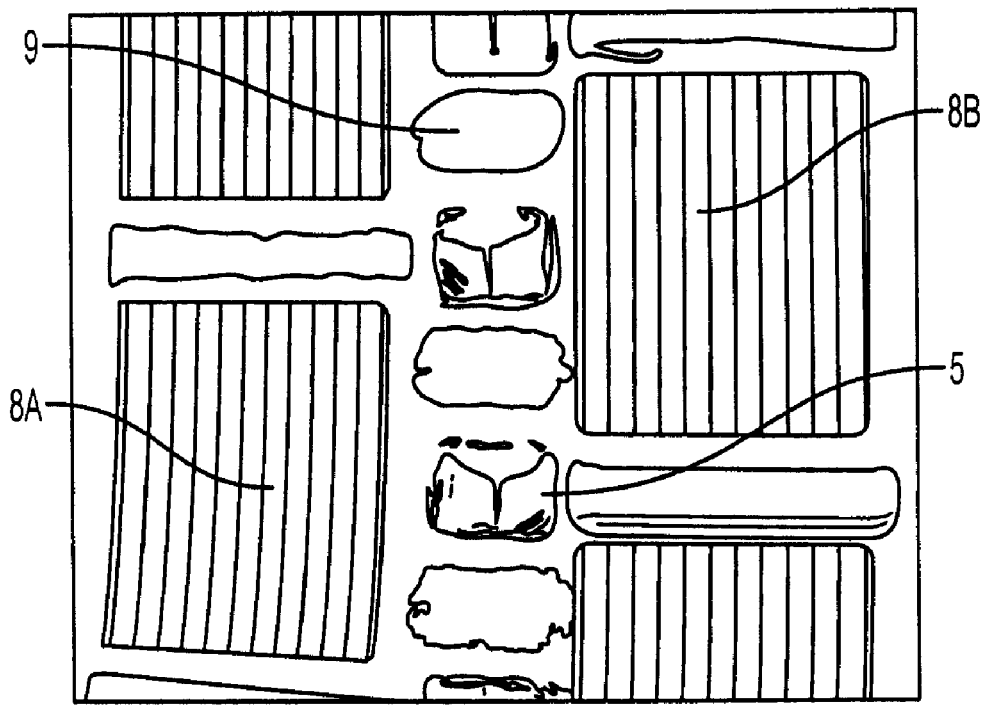
FIG. 3 is a graphical representation showing the result of a durability test of the rubber crawler having the central lug according to the invention.
Figure 3:
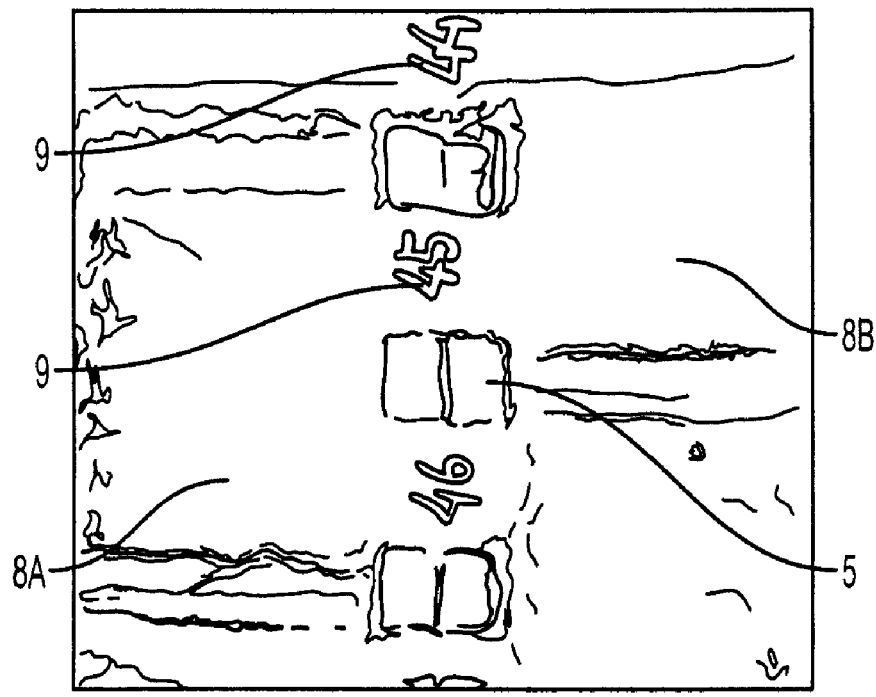
Figure 4:
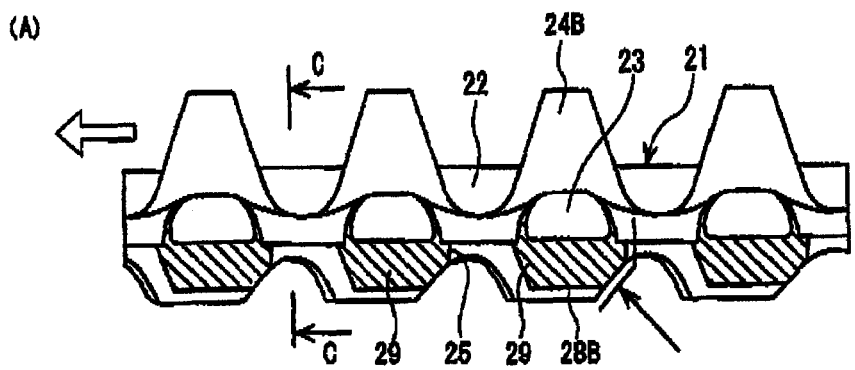
FIG. 4 shows (A) a vertical section, (B) a bottom view, and (C) a cross-section of the conventional rubber crawler.
Figure 4:
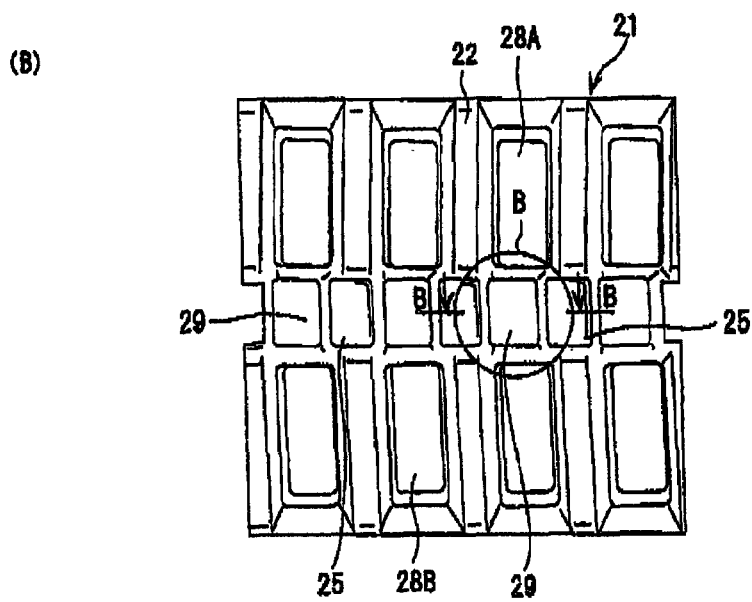
Figure 4:
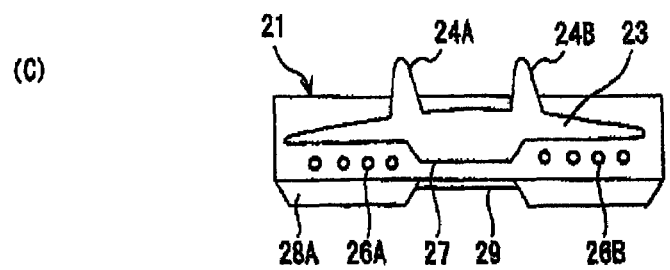
Figure 5:
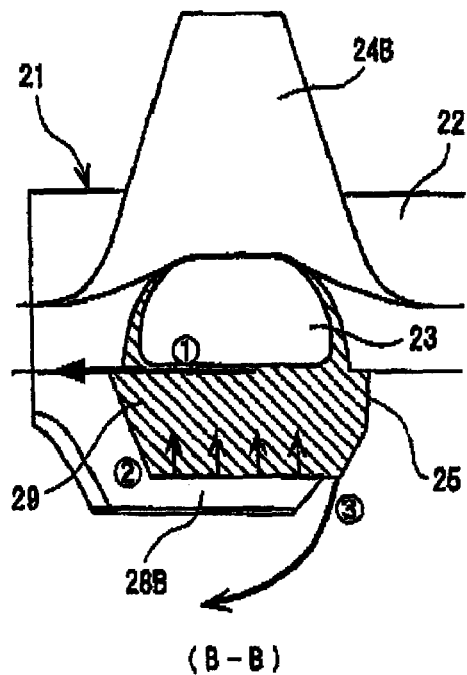
FIG. 5 is an enlarged cross-section of a substantial part of the conventional rubber crawler.
Figure 6:
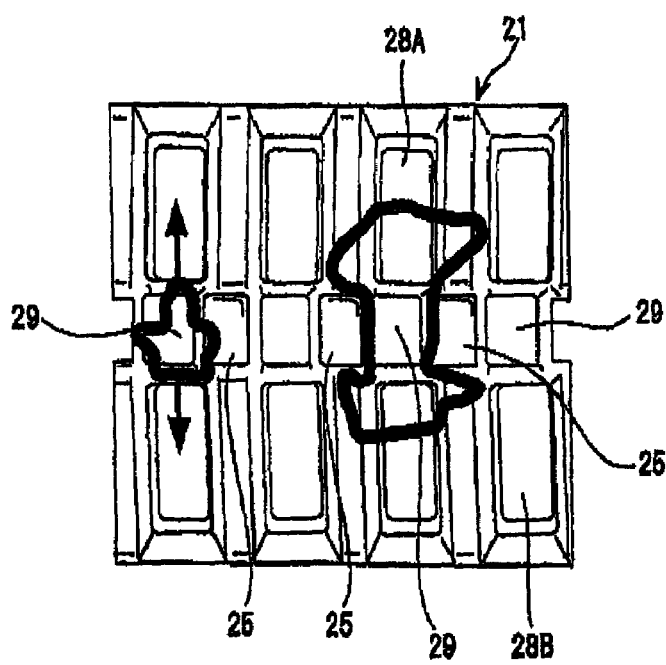
FIG. 6 is a bottom view of the conventional rubber crawler for explaining an enlargement of the peeling in the rubber crawler.
Figure 7A:
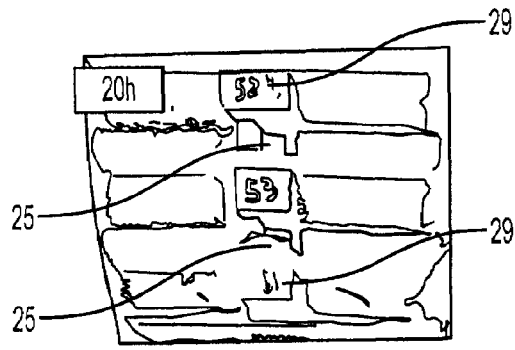
FIG. 7 is a graphical representation of the result of the durability test for the conventional rubber crawler.
Figure 7B:
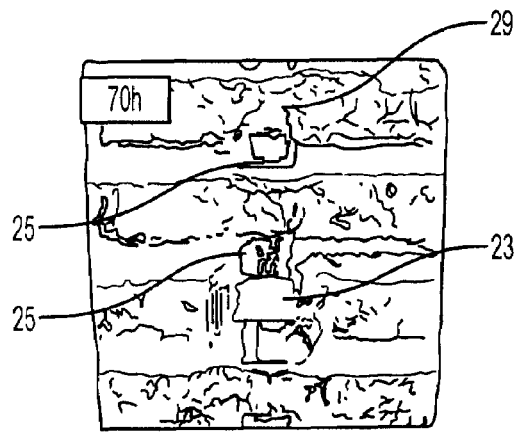
Figure 7C:
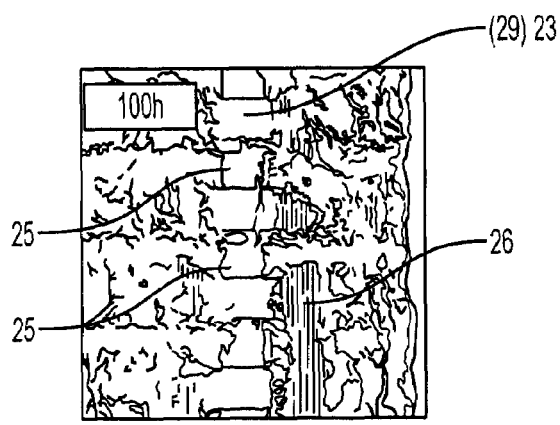

FIG. 3 is a graphical representation of results of a durability test of the rubber crawler 1 having the central lug 9. In FIG. 3, a brand-new product (which was used for 0 h) shown in an upperside of the figure is compared to a product used for 100 h which is shown in a lowerside of the figure. In the durability test, a track laying vehicle having the rubber crawler of the invention and the conventional rubber crawler of FIG. 7 arranged side by side around the left and right side of the main body is driven. The track laying vehicle is produced in the same specification and dimension. It is observed that as to the rubber crawler 1 shown in the upperside of the figure, the central lug 9 which connects the left and right side tread members 8A, 8B sufficiently protuberates between the sprocket engagement holes 5 (because of a thin film which is formed directly after production) on the ground contacting side.

After the durability test was carried out for 100 h, it is observed in the rubber crawler 1 shown in the lowerside of the figure that abrasion is considerably generated on the surface of the tread members 8A, 8B, peeling occurs around the sprocket engagement hole 5 and abrasion is also generated on the central lug 9 (indicated by a number such as 44 to 46 of a white character). However, it is not found that the abrasion is not generated to such an extent that the core 3 emerges and the tread members 8A, 8B peel. This means that the rubber crawler of the invention brings about the sufficient durability, while the conventional rubber crawler of FIG. 7 suffers from the exposure of the core 23 due to peeling a part of the central lug 29 and peeling off the tread members derived from the peeling of the central lug after subjected to the 70 h durability test.

The present invention was explained above in details based on the embodiment. The invention can be appropriately modified within the spirit and scope of the invention. For instance, modification can be applied to a shape, a type and a cross-section of the main body including the formation and the arrangement embodiment of the tread member; a formation of the guide member; a shape including an embedding formation of the core; a shape including a curvature of the central lug viewed from a lateral side of the rubber crawler (for example, the arc can differs between the driving side and the coast side at the time of the forth movement); a connection structure between the central lug and the tread member (for example, the central lug can be arranged so as to be in the same plane as the tread member); and a type of the filament cords constituting the main cord (in addition to the main cord, other cords can be embedded) such as the twisting type of the cord or the like, a material of such cord, and a manner of rubberizing.

EFFECT OF THE INVENTION

As mentioned above, a rubber crawler of the invention has a plurality of longitudinally spaced cores embedded in a width direction of the rubber crawler, sprocket engagement holes perforated between the cores, two rows of longitudinally spaced tread members disposed on the left and right side of the outer peripheral grounding surface of the rubber crawler respectively, and a central lug arranged between the tread members for binding the tread members in an embedding position of the core, wherein a shape of the central lug viewed from a lateral side of the rubber crawler is approximately in the form of an arc. Therefore, when driving of the rubber crawler repeating back and forth movement, even if a large resisting force from the road surface due to an impediment, such as gravel, acts on the central lug particularly disposed close to a sprocket engagement section, the resisting force can be parried for dispersion to a suitable degree by such arrangement, so that there is no possibility of early peel occurring in the central lug or such peeling is prevented from extending to tread members connected thereto; thus, the life is prolonged.

Also, when a shape of the central lug is configured such that a center of circle corresponding to the arc is located in a surface on a ground contacting side of the core, it is possible for the rubber crawler to be fitted to a vehicle repeating the back and forth movement, due to in addition to sufficiently getting the thickness and improving the durability performance, having no directivity of a longitudinal direction for the arc.

Furthermore, when the central lug is arranged inside a rear side of the tread member with respect to the running direction of the rubber crawler, a resisting force from the road surface substantially acts on the tread members in which an area contacting to the ground can be largely configured, a small surface subjected to the force can be structured, and the durability performance is comparatively high. Therefore, it is possible for the central lug to avoid an interference with the impediment on the road surface and to reduce an opportunity of a damage which leads to peel off the tread members.

As can seen from the above, a rubber crawler is provided according to the present invention which dissolves the problem of the conventional rubber crawler, effectively prevents the damage in the central lug section causing a peeling of the tread member, and makes it possible to remarkably improve a durability performance.

The list of reference numbers in FIGS. is as follows:
1 rubber crawler
2 rubber main body
3 core
4 guide member
4A left guide member
4B right guide member
5 sprocket engagement hole
6 reinforcing cord
6A left reinforcing filament
6B right reinforcing filament
7 sprocket engagement section
8 tread member
8A left tread member
8B right tread member
8C rear side
9 central lug
9A arc
G center on the ground contacting side of the core

What is claimed is:

1. A rubber crawler comprising:
a main body,
a plurality of longitudinally spaced metal cores embedded in a width direction of the main body,
sprocket engagement holes perforated between the metal cores,
two rows of longitudinally spaced tread members disposed on the left and right side of an outer peripheral grounding surface of the rubber crawler, and
a plurality of central lugs arranged between the tread members for binding the tread members, the metal cores being embedded respectively in the central lugs, such that the metal cores are partially encircled by the central lugs,
wherein a shape of the central lugs viewed from a lateral side of the rubber crawler is approximately in the form of an arc, the arc being projected to have a convexity in a direction of the outer peripheral grounding surface, and
wherein at least a portion extending along the arc has a constant radius when measured from a centerline of the respective central lugs.

2. The rubber crawler as defined in claim 1, wherein the arc is configured such that a center of a circle corresponding to the arc is located in a surface on a ground contacting side of the core.

3. The rubber crawler as defined in claim 2, wherein the central lugs are positioned inside of the tread members and near a rear surface of the tread members with respect to the running direction of the rubber crawler.

4. The rubber crawler as defined in claim 1, wherein the central lugs are positioned inside of the tread members and near a rear surface of the tread members with respect to the running direction of the rubber crawler.

5. The rubber crawler as defined in claim 1, wherein the cores include a flat portion which faces towards the arc.

6. The rubber crawler as defined in claim 1, wherein a portion of the central lugs that are occupied by the cores is opposite the arc.

7. The rubber crawler as defined in claim 1, wherein the cores are symmetrical with respect to the arc.

8. The rubber crawler as defined in claim 1, further including reinforcing elements which extend in the first and second longitudinal directions of the crawler.

9. The rubber crawler as defined in claim 1, wherein an inner peripheral side of the cores partially comes out of the central lugs.

10. A rubber crawler comprising:
a main body,
a plurality of longitudinally spaced metal cores embedded in a width direction of the main body,
sprocket engagement holes perforated between the metal cores,
two rows of longitudinally spaced tread members disposed on the left and right side of an outer peripheral grounding surface of the rubber crawler, and
a plurality of central lugs arranged between the tread members for binding the tread members, the metal cores being embedded respectively in the central lugs, such that the metal cores are partially encircled by the central lugs,
wherein a shape of the central lugs viewed from a lateral side of the rubber crawler is approximately in the form of an arc, the arc being projected to have a convexity in a direction of the outer peripheral grounding surface, and
wherein the arc corresponds to a circle having its center along a centerline of the central lugs.

* * * * *